(No Model.)

P. WAGNER.
KNOB ATTACHMENT.

No. 305,645. Patented Sept. 23, 1884.

WITNESSES:
A C Aubery
R L Wolcott

Philipp Wagner,
INVENTOR

BY Frank Malocsay
ATTORNEY

UNITED STATES PATENT OFFICE.

PHILIPP WAGNER, OF BROOKLYN, NEW YORK, ASSIGNOR OF ONE-HALF TO EDWARD S. MAYER, OF SAME PLACE.

KNOB ATTACHMENT.

SPECIFICATION forming part of Letters Patent No. 305,645, dated September 23, 1884.

Application filed May 5, 1884. (No model.)

*To all whom it may concern:*

Be it known that I, PHILIPP WAGNER, of Brooklyn, in the county of Kings and State of New York, have invented an Improvement in Lever Door-Knobs, of which the following is a specification.

This invention comprises a novel combination of parts whereby is provided a lever door-knob in which the several parts composing the apparatus are firmly and securely held in due relation with each other for effective operation, and particularly whereby the screw-sleeve which connects the shank with the lever-knob is prevented from turning with reference to the latter, and is securely held in place in connection therewith.

Figure 1:
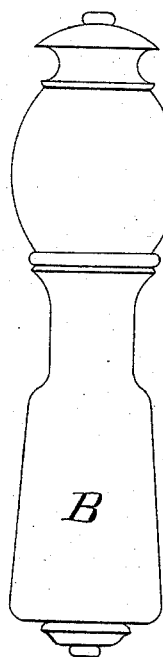
Figure 1:
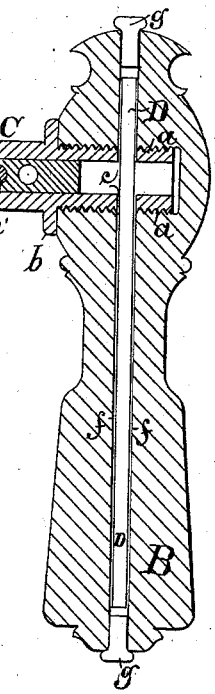
Figure 2:
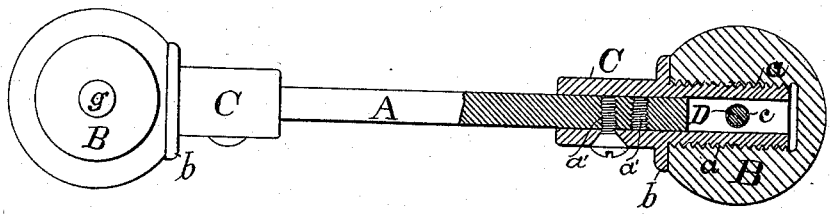

Figures 1 and 2 are respectively side views and central longitudinal sectional views taken in planes at right angles to each other.

A is the square bolt or shank, which passes through the lock, and by these or any suitable means is connected with the locking bolt or catch. Inasmuch as this connection of the said bolt or shank A with the locking bolt or catch is a matter well understood in the art, no specific description thereof is here required. B are the lever-handles, of which there is one at each end of the said shank. Inasmuch as said lever-handles are kept in place in said manner, a description of one applies to both. The end of the shank or bolt A is fitted into a square socket in the end of a sleeve, C, and is held thereon by a set-screw which passes through a suitable hole in one side of said sleeve, and is screwed into a suitable threaded hole in the shank. The sleeve C is provided at its inner end with the screw-thread $a$, there being at the outer end of the said threaded portion a circumferential flange, $b$. Extended through the said threaded portion $a$ of said sleeve is a slot or hole, $c$. The lever-handle A is bored from end to end, as shown at $f$, this bore $f$ being coincident with the hole $c$ of the sleeve when the latter is screwed into place, as shown in the drawings, and with the flange $b$ pressed against the adjacent surface of the lever-handle. A key, D, which may consist simply of a straight piece of wire, is passed into the bore $f$ and through the hole or slot $c$, thereby locking the sleeve in its relation with the lever-handle.

In order to prevent the displacement of the key D, the ends of the bore $f$ are closed by slotted plugs $g$, driven or otherwise securely fixed in the ends of the said bore. It will be seen, therefore, that the several correlated parts are held and secured in proper relation with each other. Inasmuch as the plugs prevent the escape of the key, the key prevents the axial displacement of the sleeve, and the said screw prevents the longitudinal escape of the shank or bar from the sleeve, thereby insuring under all circumstances the efficient operation of the lever-handle in its action upon the shank or bolt A.

What I claim as my invention is—

The combination of a lever-handle having a longitudinal bore, $f$, from end to end, into which fits the rod D, the sleeve C, constructed with a square socket, a threaded inner end, hole $c$, and flange $b$, the square shank or bolt A, having threaded hole $a'$, the set-screw, and the plugs $g$, the whole constructed and arranged for joint use and operation, all substantially as and for the purpose herein set forth.

PHILIPP WAGNER.

Witnesses:
A. C. AUBERY,
R. L. WOLCOTT.